United States Patent [19]

Langenohl

[11] Patent Number: 5,340,782

[45] Date of Patent: Aug. 23, 1994

[54] VITREOUS SILICA-BASED PLASTIC REFRACTORY

[75] Inventor: Mark C. Langenohl, Pittsburgh, Pa.

[73] Assignee: Indresco Inc., Dallas, Tex.

[21] Appl. No.: 97,108

[22] Filed: Jul. 26, 1993

[51] Int. Cl.$^5$ ............................................. C04B 35/14
[52] U.S. Cl. ................................... 501/133; 501/128; 501/130; 501/142
[58] Field of Search ............... 501/128, 129, 130, 131, 501/133, 142, 154

[56] References Cited

U.S. PATENT DOCUMENTS

| | | | |
|---|---|---|---|
| Re. 33,366 | 10/1990 | Barrall | 501/84 |
| 3,303,034 | 2/1967 | Troell et al. | 501/128 |
| 4,162,179 | 7/1979 | Campana | 156/89 |
| 4,212,680 | 7/1980 | Schulz | 501/153 |
| 4,331,773 | 5/1982 | Hongo et al. | 501/128 |
| 4,440,856 | 4/1984 | Salazar | 501/95 |
| 4,656,146 | 4/1987 | Schlett et al. | 501/124 |
| 4,687,752 | 8/1987 | Peters | 501/121 |
| 4,874,726 | 10/1989 | Kleeb et al. | 501/124 |
| 4,992,397 | 2/1991 | Hughes, Jr. | 501/124 |

*Primary Examiner*—Karl Group
*Assistant Examiner*—Chris Gallo
*Attorney, Agent, or Firm*—John L. Sigalos

[57] ABSTRACT

A vitreous silica-based plastic refractory comprising at least 50 wt. % vitreous silica having a purity of at least 99% silica, a refractory plasticizer, and a bonding system containing an alpha alumina-containing alumina capable of reacting with phosphoric acid to form an aluminum phosphate bond and phosphoric acid.

14 Claims, No Drawings

VITREOUS SILICA-BASED PLASTIC REFRACTORY

BACKGROUND OF THE INVENTION

The present invention relates to vitreous silica-based plastic refractory mixes and plastic refractories bonded with aluminum phosphate which have a long shelf life, low bulk densities as compared to other plastics, excellent resistance to both acids and alkalies, high-strengths, excellent thermal shock resistance and good abrasion resistance.

Plastic refractories are well known products, namely being mixtures of ground refractory materials in stiff plastic form suitable for ramming into place to form monolithic linings. These plastic refractories are commonly installed by hand using mallets or by conventional pneumatic hammers. Such plastics are utilized in making rapid repairs in a wide variety of vessels as well as for forming monolithic linings for heating furnaces, boiler settings, forging ovens, annealing ovens and furnaces, cupolas, magnesium electrolytic cells, titanium chlorinators, in certain areas of incinerators, in devices used to refine petroleum, and many other industrial applications where the lining is prone to thermal shock and acid or alkali contact at high temperatures.

A number of different refractories have been utilized in order to make a plastic which will be resistant to both acid and alkalies, have better creep resistance at high temperatures and thermal shock resistance as well as a suitable shell life. It has been known to primarily use aluminous or silicon carbide aggregates as well as various types of bonding phases, primarily aluminum phosphate in order to increase the strength, acid resistance and thermal shock resistance, but such plastics still have been unsatisfactory.

Salazar U.S. Pat. No. 4,440,865 discusses a means of improving the shelf life and wet strength of plastics. This patent describes use of perlite, which is a form of silica, but it is weak and friable and could not be used in a plastic which is rammed during installation.

SUMMARY OF THE INVENTION

The present invention overcomes the problems of prior plastic refractories and provides excellent resistance to both acids and alkalies, has a long shelf life, high strength, high thermal shock resistance, and good abrasion resistance.

Briefly stated, the present invention comprises a vitreous silica-based plastic refractory mix comprising at least 50 wt. % vitreous silica having a purity of at least 99% silica, a refractory plasticizer, and an alpha alumina-containing alumina compound capable of reacting with phosphoric acid to form an aluminum phosphate bonding system for said plastic refractory. Shrinkage control materials can also be added for control of high temperature dimensional changes.

The present invention also comprises the resultant plastic refractory containing phosphoric acid and water with the alumina compound and phosphoric acid being present in amounts to form sufficient aluminum phosphate to bond the plastic refractory and the water being present in amounts sufficient for desired workability of the plastic refractory.

DETAILED DESCRIPTION

As used herein the term "vitreous silica" is intended to be synonymous with amorphous silica and intended to cover both fused silica which is 100% vitreous silica as well as what has sometimes been called "vitreous silica" containing 90% vitreous silica and 10% crystalline phases; i.e., quartz and cristobalite. Thus, the term "vitreous silica" as used herein means any silica having at least 99% purity, preferably 99.5%, and at least 90% vitreous silica, preferably 100%, or a mixture thereof.

It is necessary to use the highest purity silica in that this gives the greatest strengths since the presence of iron oxide, magnesia, and lime, amongst other impurities, when present in the silica or other components of the mix can lower the strength since these materials are known to react with phosphoric acid to form phases that weaken the strength of the plastic refractory.

As is common in making plastic refractories it is desirable to vary the particle sizes of the refractory, in this case the vitreous silica with the optimum screen analysis (Tyler) being:

| Screen Size (m) | Wt. % |
| --- | --- |
| +10 | 20 |
| 10/28 | 22 |
| 28/65 | 8 |
| −65 | 50 |

Moreover, a further necessary component is any conventional refractory plasticizer. It is well known that materials such as ball clay, bentonite, and organic plasticizers are utilized with plastic refractories in order to plasticize them, i.e., make them more malleable. These are ordinarily used in an amount of about 1 to 20 wt. % depending on the particular plasticity desired of the refractory.

A third essential component of the plastic refractory is the aluminum phosphate bonding phase and this consists of any alpha alumina-containing alumina compound capable of reacting with phosphoric acid to form an aluminum phosphate bonding phase for the refractory and, of course, the phosphoric acid. Monoaluminum phosphate can be utilized in place of the phosphoric acid, but it is not as effective. Preferred for this purpose of forming a bond are calcined or reactive alumina and they typically are used in amounts of 1 to up to about 30 wt. %. As to the phosphoric acid the amount utilized is related to the amount of alumina used, ordinarily about 1 to 20 wt. % based on the weight of the mix. It will be obvious that the amount of bonding agent used is that required to bond any particular plastic refractory composition and can be determined by routine experimentation.

Again, both the plasticizer and the bonding agent used should be as pure as possible to minimize the impurities that could react with the phosphoric acid and weaken the resultant plastic refractory.

It is preferred to utilize 75% grade phosphoric acid ordinarily in an amount from 1 to 10% based on 100 parts by weight of the mix. Here again, any phosphoric acid conventionally utilized to react with an alumina compound to form an aluminum phosphate bonding phase can be utilized for this purpose.

The only other component necessary to be added to form the mix is water which is added in an amount to achieve the necessary workability.

While not essential, it is preferred to also utilize a shrinkage control material such as quartzite, kyanite, sillmanite, and andalusite to permit reheat expansion capability and minimize cracking at elevated temperatures. These are usually added in amounts of up to 20 wt. %. Of these, kyanite is preferred in an amount of about 10 wt. %.

As to proportions in the mix, there can be used from 50 to 90 wt. % of vitreous silica, 1 to 10 wt. % refractory plasticizer, 1 to 30 wt. % alumina compound, and up to 20 wt. % shrinkage control material, plus up to 20% phosphoric acid for bond formation and water as required to achieve a desired workability.

It has been found that the resultant mix has an excellent shelf life of several months.

When the plastic has obtained its proper workability or plasticity it is then simply applied in the conventional manner utilizing any conventional ramming equipment, such as the pneumatic hand rammers.

The invention will be further described in connection with the following examples which are set forth for purposes of illustration only.

EXAMPLE 1

A refractory plastic was made having the following components:

| Mix Components | Wt. % |
| --- | --- |
| Vitreous Silica, 4/10 | 22% |
| Vitreous Silica, 10/28 | 26 |
| Vitreous Silica, 28/65 | 3 |
| Fused Silica Fines | 14 |
| Calcined Alumina | 20 |
| Crude Kyanite, −100 m | 10 |
| Bentonite | 5 |
| | 100% |
| Plus Addition | |
| 75% Grade Phosphoric Acid | 7 |
| Water for Workability | |
| Desired Workability As Made | 50 |
| Desired Screen Analysis (Using Tyler Screens) | |
| −10 m | 20 |
| 10/28 | 22 |
| 28/65 | 8 |
| −65 m | 50 |
| | 100% |

The resultant refractory plastic was then tested for bulk density and strength and the resultant physical properties are set forth in Table I that follows:

TABLE I

| | |
| --- | --- |
| Bulk Density, pcf | |
| After 500° F. Dry: | 129 |
| After 1500° F.: | 129 |
| After 2000° F.: | 128 |
| Modulus of Rupture, psi | |
| After 500° F. Dry: | 890 |
| After 1500° F.: | 850 |
| After 2000° F.: | 890 |
| Hot Modulus of Rupture, psi | |
| At 1500° F.: | 2320 |
| Linear Change, % | |
| After 1500°: | 0.0 |
| After 2000° F.: | +0.2 |

EXAMPLES 2 TO 11

A series of 10 mixes were formed and plastic refractories formed therefrom by the plus addition of phosphoric acid and water. Mixes 2 to 4 utilized a conventional aluminum phosphate bond, mixes 5 to 7 utilized a sodium silicate bond, and mixes 8 to 10 utilized a potassium silicate bonding system. Mix 11 contained a dry boron phosphate addition. The mix formulations were set forth in Table II below.

The resultant plastic refractories were tested as to storage and physical properties and the results are set forth in Tables II and III below. For test purposes all were pressed into 6×1×1" bars at 1,000 psi on a Denison press and storage samples were also taken. Seventy-two hour boiling acid, alkali, and creep testing were conducted, along with physical property evaluations on each of the plastics. It should be noted that the presence of boron phosphate in Mix 11 appears to be responsible for a significant improvement in resistance to aluminum penetration/reaction compared to a similar mix, Mix 2.

For further comparison, a commercially available refractory plastic, CORAL PLASTIC, which is a phosphate-bonded 85% alumina plastic composition also containing kyanite and bentonite was also tested as to acid and alkali resistance and the results thereon are included in Table III. For acid testing 2×1×1" samples reheated to 1500° F. prior to testing were utilized.

TABLE II

| Example No. | 2 | 3 | 4 | 5 | 6 | 7 | 8 | 9 | 10 | 11 |
| --- | --- | --- | --- | --- | --- | --- | --- | --- | --- | --- |
| Mix Components: | | | | | | | | | | |
| Vitreous Silica, 4/10 | 22% | 22% | 22% | 22% | 22% | 22% | 22% | 22% | 22% | 22% |
| Vitreous Silica, 10/28 | 26 | 26 | 26 | 26 | 26 | 26 | 26 | 26 | 26 | 26 |
| Vitreous Silica, 28/65 | 3 | 3 | 3 | 3 | 3 | 3 | 3 | 3 | 3 | 3 |
| Fused Silica Fines | 14 | 21.5 | — | 36.5 | 34 | — | 34 | — | 34 | 12.5 |
| Potters Flint, −200 m | — | — | 21.5 | — | — | 34 | — | 34 | — | — |
| Calcined Alumina | 20 | 20 | 20 | — | — | — | — | — | — | 20 |
| Crude Kyanite, −100 m | 10 | — | — | — | — | — | — | — | — | — |
| Bentonite | 5 | 7.5 | 7.5 | 5 | 7.5 | 7.5 | 7.5 | 7.5 | 7.5 | 5 |
| Dry boron phosphate Powder | — | — | — | — | — | — | — | — | — | 1.5 |
| Sodium Silicate Powder | — | — | — | 7.5 | 7.5 | 7.5 | — | — | — | — |
| Potassium Silicate Powder | — | — | — | — | — | — | 7.5 | 7.5 | 7.5 | — |
| Plus Additions: | | | | | | | | | | |
| 75% Grade Phosphoric Acid | 7 | 7 | 7 | — | — | — | — | — | — | 7 |
| Water, to Press | 5.7 | 6.5 | 7.0 | — | 12 | 11 | 11 | 10 | 13 | 6.3 |
| Water, to Store | 8.0 | 9.0 | 9.0 | — | 15.5 | 13.5 | 13 | 13.2 | — | 7.3 |
| Desired Screen Analysis (Using Tyler Screen) | | | | | | | | | | |
| +10 m | 20 | 20 | 20 | 20 | 20 | 20 | 20 | 20 | 20 | 20 |
| 10/28 | 22 | 22 | 22 | 22 | 22 | 22 | 22 | 22 | 22 | 22 |
| 28/54 | 8 | 8 | 8 | 8 | 8 | 8 | 8 | 8 | 8 | 8 |

TABLE II-continued

| Example No. | 2 | 3 | 4 | 5 | 6 | 7 | 8 | 9 | 10 | 11 |
|---|---|---|---|---|---|---|---|---|---|---|
| −65 m | 50 | 50 | 50 | 50 | 50 | 50 | 50 | 50 | 50 | 50 |
| Workability Index (14 lb wt) | | | | | | | | | | |
| As Made to Press: | 21 | 20 | 28 | — | 30 | 32 | 21 | 28 | Poor | 29 |
| As Made to Store: | 59 | 54 | 54 | (1) | 56 | 54 | 59 | 59 | Cohesion (2) | 47 |
| After 30 Days: | 44 | 42 | 41 | — | 21 | 32 | Hard | Hard | — | 39 |
| After 60 Days: | 33 | 34 | 35 | — | Hard | 15 | (Not Workable) | (Not Workable) | — | — |
| (% Decrease after 60 Days) | (44) | (37) | (35) | — | (100) | (72) | | | — | — |
| Bulk Density, pcf | | | | | | | | | | |
| After Drying at 500° F.: | 129 | 126 | 132 | — | 116 | 124 | 110 | 116 | 106 | 129 |
| After 1500° F. Reheat: | 129 | 126 | 129 | — | 109 | 118 | 110 | 119 | — | 128 |
| After 2000° F. Reheat: | 128 | 126 | 128 | — | 109 | 116 | 111 | 118 | 109 | 128 |
| Modulus Of Rupture, psi | | | | | | | | | | |
| After Drying at 500° F.: | 890 | 670 | 460 | — | 1880 | 1880 | 1030 | 500 | 460 | 730 |
| After 1500° F. Reheat: | 850 | 870 | 450 | — | 900 | 730 | 370 | 280 | 250 | 1010 |
| After 2000° F. Reheat: | 890 | 1040 | 520 | — | 380 | 370 | 450 | 300 | 350 | 1090 |
| At 1500° F. | 2320 | 2100 | 1470 | — | 390 | 240 | 1330 | 970 | 980 | 2480 |
| 1500° F. Reheat | | | | | | | | | | |
| % Linear Charge: | 0.0 | 0.0 | +0.2 | — | +1.0 | +1.3 | +0.2 | +0.1 | — | +0.2 |
| % Volume Charge: | 0.0 | 0.0 | +0.4 | — | +2.4 | +2.9 | −1.3 | −1.9 | — | +0.2 |
| 2000° F. Reheat | | | | | | | | | | |
| % Linear Charge: | +0.2 | +0.1 | +0.2 | — | +1.0 | +1.3 | +0.3 | +0.3 | −0.1 | +0.2 |
| % Volume Charge: | +1.2 | +0.1 | +0.4 | — | +2.9 | +5.4 | −0.7 | −0.7 | −2.3 | +8.4 |
| 72 Hr. Aluminum Cup Test Using 7075 Alloy at 1500° F. | | | | | | | | | | |
| Aluminum Penetration: | Up to ¼" | — | — | — | — | — | — | — | — | None |
| Aluminum Adherence: | Strong | — | — | — | — | — | — | — | — | Strong To Moderate |
| Change in Metal Chemistry | | | | | | | | | | |
| Silicon (Si): | +14.4 | — | — | — | — | — | — | — | — | +0.5 |
| Iron (Fe): | +0.09 | — | — | — | — | — | — | — | — | 80.00 |
| Magnesium (Mg): | −2.08 | — | — | — | — | — | — | — | — | −0.95 |

Note:
(1) No storage samples evaluated. Up to 15% water was added and a 55 W.I. was achieved but mix crumbled when tested and had no plasticity. No physical property samples made.
(2) No storage samples made. Up to 15.5% water was added but crumbled when tested.

TABLE III

A. Results of Acid Testing

| Example No. | Standard Coral Plastic | 2 | 3 | 4 | 7 | 8 | 9 | 10 |
|---|---|---|---|---|---|---|---|---|
| 72 Hour Boiling Acid Test Using Hydrochloric Acid % Weight Loss: | 8.2 | 6.9 | 6.7 | 7.1 | 0.5 | 0.4 | 0.5 | 0.6 |

B. Results of Alkali Testing at 1800° F.

| Example No. | Standard Coral Plastic | 2 | 3 | 4 | 6 | 7 | 8 | 9 |
|---|---|---|---|---|---|---|---|---|
| Alkali Cube Test at 1800° F. Rating After | | | | | | | | |
| Cycle 1: | 1,1,1 | 1,1,1 (some glazing) | 1,1,1 (glazing) | 1,1,1 (glazing) | 1,1,1 (glazing) | 1,1,1 (glazing) | 1,1,1 (glazing) | 1,1,1 (glazing) |
| Cycle 2: | 1,1,1 | 1,1,1 (glazing) | 1,1,1 (glazing) | 1,1,1 (glazing) | 1,1,1 (glazing) | 2,1,1 (glazing) | 1,1,1 (glazing) | 1,1,1 (glazing) |
| Cycle 3: | 2,1,1 | 1,1,1 (glazing) | 1,1,1 (glazing) | 1,1,1 (glazing) | 1,1,1 (5) (glazing) | 2,1,1 (5) (glazing) | 1,1,1 (5) (glazing) | 1,1,1 (5) (glazing) |
| Cycle 4: | 2*,1,1 | 1,1,1 (5) (glazing) | 1,1,1 (glazing) | 1,1,1 (5) (glazing) | 1,1,1 (5) (glazing) | 2,1,1 (5) (glazing) | 1,1,1 (5) (glazing) | 1,1,1 (5) (glazing) |
| Cycle 5: | 2*,1*,1 | 1,1,1 (5) (glazing) | 1,1,1 (5) (glazing) | 1,1,1 (5) (glazing) | 1,1,1 (5) (glazing) | 2,1,1 (5) (glazing) | 1,1,1 (5) (glazing) | 1,1,1 (5) (glazing) |
| Cycle 6: | 2*,2*,1 | 1,1,1 (5) (glazing) | 1,1,1 (5) (glazing) | 1,1,1 (5) (glazing) | 1,1,1 (5) (glazing) | 2,1,1 (5) (glazing) | 1,1,1 (5) (glazing) | 1,1,1 (5) (glazing) |

Rating System:
1 = Unaffected
2 = Light Cracking (less than 1/16" thick)
3 = Cracked (Greated than 1/16" thick)
4 = Disintegrated (broken into two or more pieces)
Notes:
(5) Cavity becoming enlarged, undercutting taking place.
*Showing signs of dry expansive reaction taking place.

The test procedure for alkali testing was as follows: Three samples were tested at same time. The samples were 2" cubes having a ⅞" diameter, 1" deep hole. The hole was charged with 8 grams of a 4:1 mixture of potassium carbonate ($K_2CO_3$) and sodium carbonate ($Na_2CO_3$). Each cycle consisted of an 1800° F. reheat with a 5 hour hold. After each cycle, the samples were rated, then recharged with alkali mixture for the next cycle.

After the alkali cube test the following were noted:

| | |
|---|---|
| Standard Coral Plastic: | All samples exhibited evidence of a dry expansive reaction. One sample had a white crust on top. Some small, light cracking was present. |
| Example No: | |
| 2: | None of the samples exhibited cracking. There was a small extent of undercutting in the drilled cavity. All samples exhibited glazing, but were intact. Samples looked good after the 6 cycles. Glassy alkali still remained in the cavity. |
| 3: | 2 of 3 samples were undercut to a small extent in the cavity. Samples looked good and were glazed but no cracking was evident. |
| 4: | All samples had a large extent of glazing and corrosion in the cavity. Coarse grains appeared on the surface. Bonding matrix seems to be wearing away or washing out. No cracks were present. |
| 6: | All samples had a significant glazing and corrosion in the cavity. Coarse grains appeared on the surface. Bonding matrix seems to be wearing away or washing out. No cracks were present. |
| 7: | Matrix wash-out did not happen to the extent in Example 6. Significant undercutting and cavity corrosion was evident |
| 8: | Matrix wash-out occurred as in Example 6. Significant glazing and undercutting. |
| 9: | Little matrix wash-out; same as in Example 7; Significant glazing and undercutting. |
| Overall: | The mixes of Examples 2, 3, and 4 appeared to have the best alkali resistance, even compared to standard Coral Plastic, and the best appearance after testing at 1800° F. |

Only the most promising mixes were subjected to acid, alkali and creep tests.

The results show that of Examples 2 to 11 only mixes in accord with the present invention, Examples 2 to 4, are feasible compositions for a commercial plastic. Both sodium and potassium silicate-bonded mixes had better acid resistance, but exhibited significant loss of workability after 60 days in storage while the mixes of Examples 2 to 4 did not. For this reason, the sodium and potassium silicate-bonded mixes are not satisfactory commercially. Also the mixes of Examples 2 to 4 exhibited higher densities, reheat strengths, and hot strengths at 1500° F. Compared with the standard Coral Plastic, the plastics of Examples 2 to 4 exhibited superior acid and alkali resistance.

EXAMPLE 12

A plastic in accord with the present invention was prepared in a Lancaster mixer, pressed into 6×1×1" bars on a Denison press and dried at 500° F. prior to testing. The mix formulation and test results are set forth in Table IV that follows.

TABLE IV

| Example No. | 12 |
|---|---|
| Mix Components: | |
| Vitreous Silica, 4/10 | 26% |
| Vitreous Silica, 10/28 | 20 |
| Vitreous Silica, 28/65 | 4 |
| Fused Silica Powder | 15 |
| Calcined Alumina | 20 |
| Crude Kyanite, −100 m | 10 |
| Bentonite | 5 |
| | 100% |
| Plus Additions: | |
| 75% Grade Phosphoric Acid | 7 |
| % Water to Press | 6 |
| Workability to Press | 23 |
| Desired Screen Analysis (Using Tyler Screens) | |
| +10 m | 20% |
| 10/28 | 22 |
| 28/65 | 8 |
| −65 m | 50 |
| Bulk Density pcf | 128 |
| After 500° F. (Av 10): | |
| Loss of Strength Test After 5 Cycles - 2200° F. to Air | |
| Before Cycling: | 670 |
| After Cycling: | 650 |
| % Strength Loss | 3% |
| Prism Spalling Test at 2200° F. (water quench) | |
| Cycles to Failure: | 40+[1] |
| Range: | 40+[1] |

Note:
[1] None of the samples exhibited cracking.

The above results as to Loss of Strength and Prism Spalling show that the plastic of the present invention has superior thermal shock resistance as shown by the 40+ cycles to failure.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A vitreous silica-based plastic refractory mix comprising at least 50 wt. % vitreous silica having a purity of at least 99% silica, a refractory plasticizer, and an alpha alumina-containing alumina compound capable of reacting with phosphoric acid to form an aluminum phosphate bond.

2. The refractory mix of claim 1 also including a shrinkage control material.

3. The refractory mix of claim 2, wherein there is 50 to 90 wt. % vitreous silica having a purity of at least 99.5% silica, 1 to 10 wt. % refractory plasticizer, 1 to 30 wt. % alumina, and up to 20 wt. % shrinkage control material.

4. The refractory mix of claim 3, wherein the refractory plasticizer is bentonite.

5. The refractory mix of claim 4, wherein the alumina is calcined or reactive alumina.

6. The refractory mix of claim 5, wherein the shrinkage control material is kyanite.

7. The refractory mix of claim 6, wherein there is 50 to 90 wt. % vitreous silica having a purity of at least 99.5% silica, 1 to 10 wt. % bentonite, 1 to 30 wt. % calcined or reactive alumina, and 1 to 20 wt. % kyanite.

8. A vitreous silica-based plastic refractory comprising at least 50 wt. % vitreous silica having a purity of at least 99% silica, a refractory plasticizer, an alpha alumina-containing alumina compound capable of reacting with phosphoric acid to form an aluminum phosphate bond, phosphoric acid, and water, said alumina compound and phosphoric acid being present in an amount sufficient to form adequate aluminum phosphate to bond the refractory and the water being present in an amount sufficient for desired workability of the refractory plastic.

9. The refractory of claim 8, also including a shrinkage control material.

10. The refractory of claim 9, wherein there is 50 to 90 wt. % vitreous silica having a purity of at least 99.5% silica, 1 to 10 wt. % refractory plasticizer, 1 to 30 wt. % alumina, and up to 20 wt. % shrinkage control material.

11. The refractory of claim 10, wherein the refractory plasticizer is bentonite.

12. The refractory of claim 11, wherein the alumina is a calcined or reactive alumina.

13. The refractory of claim 12, wherein the shrinkage control material is kyanite.

14. The refractory of claim 13, wherein there is 50 to 90 wt. % vitreous silica having a purity of at least 99.5% silica, 1 to 10 wt. % bentonite, 1 to 30 wt. % calcined or reactive alumina, 1 to 20 wt. % kyanite, and for each 100 wt. % of the foregoing, 1 to 20 wt. % phosphoric acid.

* * * * *